Oct. 30, 1956 J. VERDERBER 2,768,709
INDEX TABLE LUBRICATION
Original Filed May 26, 1949 2 Sheets-Sheet 1

INVENTOR.
JOSEPH VERDERBER
BY
ATTORNEY

Oct. 30, 1956
J. VERDERBER
2,768,709
INDEX TABLE LUBRICATION
Original Filed May 26, 1949
2 Sheets-Sheet 2
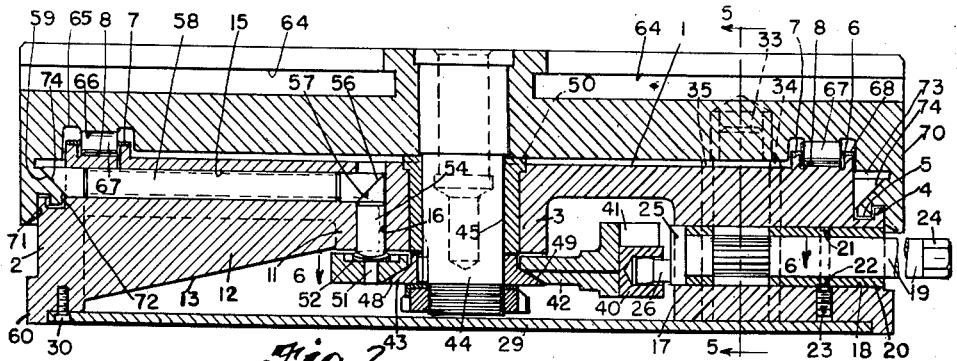
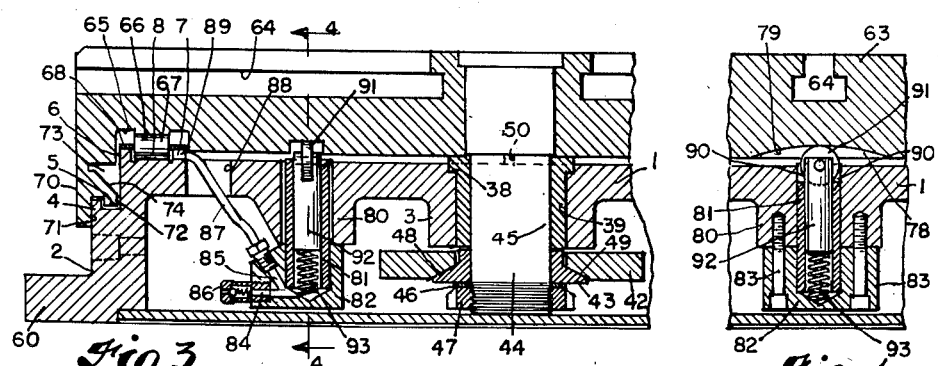
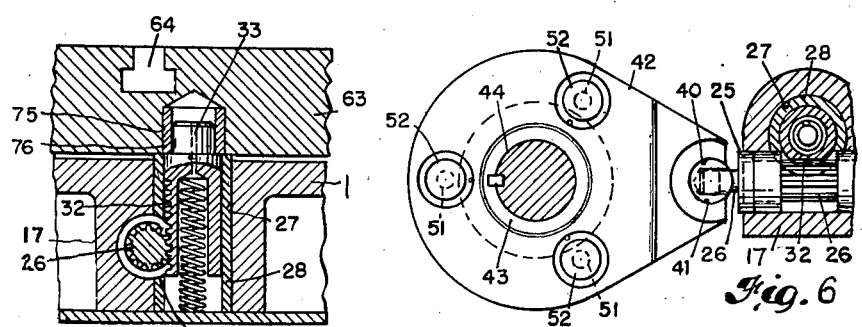
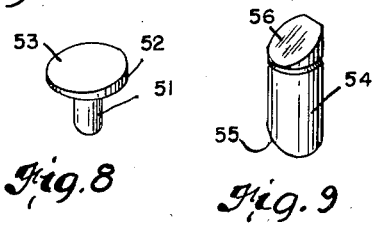
INVENTOR.
JOSEPH VERDERBER
BY
ATTORNEY United States Patent Office 2,768,709
Patented Oct. 30, 1956

2,768,709

INDEX TABLE LUBRICATION

Joseph Verderber, Cleveland, Ohio, assignor to The Cleveland Universal Jig Company, Cleveland, Ohio, a corporation of Ohio Original application May 26, 1949, Serial No. 95,433, now Patent No. 2,640,400, dated June 2, 1953. Divided and this application April 28, 1953, Serial No. 351,539

1 Claim. (Cl. 184—6)

This invention relates, as indicated, to an index table.

A primary object of the invention is to provide an index table which is well adapted for supporting work during heavy milling or boring operations.

Another object of the invention is to provide an index table of the character described, having novel indexing means and means for actuating the same.

A further object of the invention is to provide a table of the character described, having a novel locking mechanism for eliminating vibration of the table as well as strain on the indexing means.

A further object of the invention is to provide a table of the character described, in which the indexing means and locking mechanism are actuated in a predetermined sequence, by a single actuating handle or crank, thereby assuring proper sequence of functioning of same.

A further object of the invention is to provide a table of the character described, in which the table top rotates with extreme ease.

A still further object of the invention is to provide a table of the character described, having novel means for supplying a lubricant to essential operating parts of the table at predetermined intervals.

Other objects and advantages of the invention will be apparent during the course of the following description.

In the accompanying drawings, forming a part of this specification, and in which like numerals are employed to designate like parts throughout the same, Fig. 1 is a top plan view of an index table embodying the invention;

Fig. 2 is a cross-sectional view of the table, taken on the line 2—2 of Fig. 1;

Fig. 3 is a fragmentary cross-sectional view, taken on the line 3—3 of Fig. 1;

Fig. 4 is a fragmentary cross-sectional view, taken on the line 4—4 of Fig. 3;

Fig. 5 is a fragmentary cross-sectional view, taken on the lines 5—5 of Figs. 1 and 2;

Fig. 6 is a fragmentary cross-sectional view, taken on the line 6—6 of Fig. 2;

Fig. 7 is an elevational view of the eccentric collar on the drive shaft;

Fig. 8 is a perspective view of one of the lower cam pins;

Fig. 9 is a perspective view of the upper cam pins, and

Figure 1:
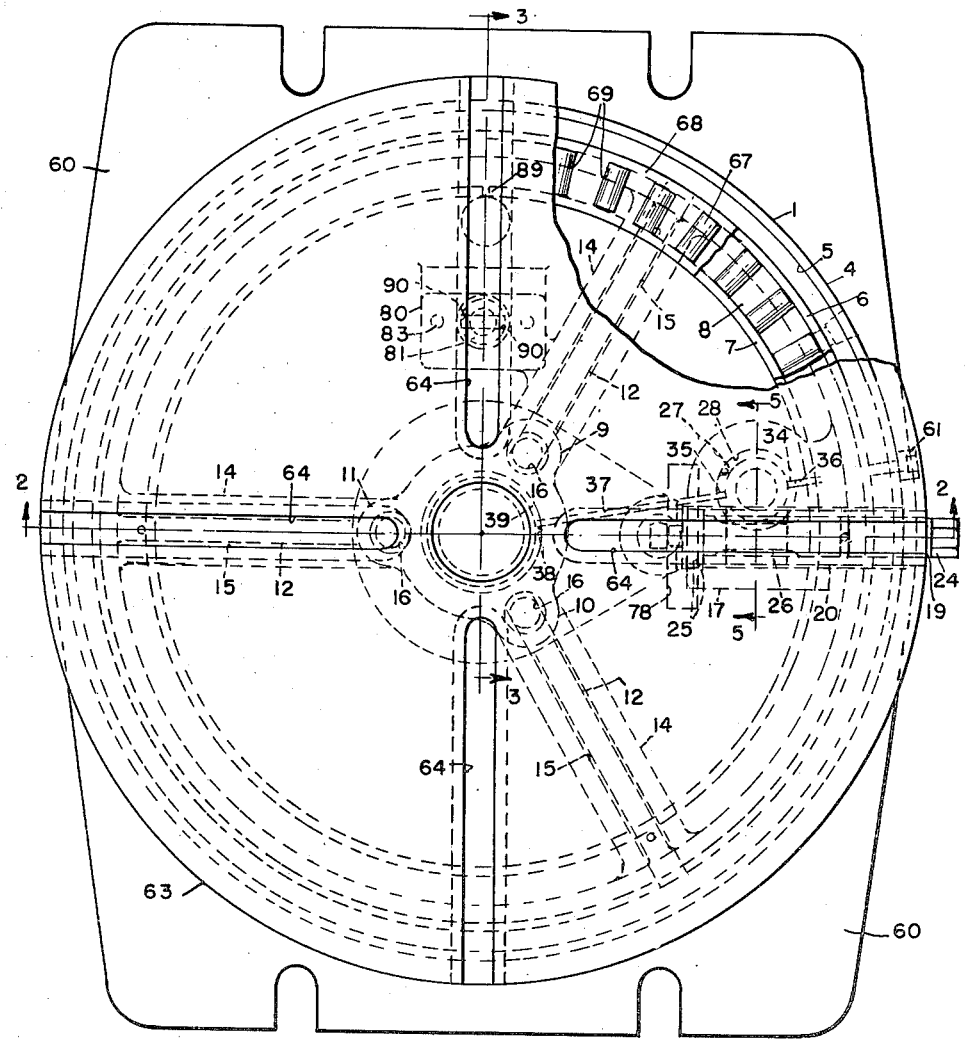
Figure 10:
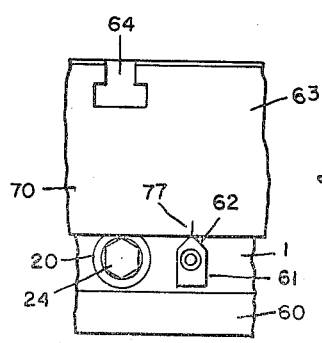
Fig. 10 is a fragmentary side elevational view, showing certain parts of the index table.

Referring more particularly to the drawings, the index table will be seen to comprise a base having a circular top 1, an annular skirt 2, which depends from the peripheral portion of the top, and a hub portion 3 depending from the central portion of the top into the space defined by the skirt 2.

A portion of the periphery of the top 1 is removed to provide an annular rib 4 and an annular recess 5 adjacent this rib, and extending upwardly from the top 1, adjacent the peripheral edge thereof, is a pair of spaced concentric annular ribs 6 and 7 forming a track or raceway 8 therebetween.

Extending radially-outwardly from the hub portion 3 of the base, at points spaced 120 degrees apart, are bosses 9, 10 and 11, from which reinforcing ribs 12 extend, these ribs extending to the inner face of the skirt 2. The ribs have inclined lower edges 13, and are thickened in their upper portions to merge with the lower surface 14 of the top. The base is provided with radially-extending passageways 15 which extend through the portions of the top 1 directly above the ribs 12, and communicate at their radially-innermost ends with vertical passageways or openings 16 which extend through the bosses 9, 10 and 11.

The base further includes a boss 17 which extends inwardly from the skirt 2, into the space between those ribs which extend from the bosses 9 and 10 of the hub 3. The boss 17 has an opening 18 extending therethrough, the axis of which extends radially from the axis of the base, and disposed within this opening is a shaft 19. The shaft 19 has rigidly secured thereto, intermediate its ends, a sleeve 20 which rotates in the opening 18. The sleeve 20 is provided with an annular groove 21, into which the nose 22 of a set screw 23 extends, the screw serving to prevent axial displacement of the shaft 19 from the opening 18. The shaft 19 has a hexagonal outer end 24, whereby the shaft is driven, and has rigidly secured to its inner end a collar 25 provided with a pin 26, the axis of which is offset from the axis of the shaft 19. Between the sleeve 20 and collar 25, the shaft 19 has gear teeth cut therein to form a pinion 26.

Extending through the boss 17, adjacent to but at right angles to the opening 18, is an opening 27, in which a bushing 28 is mounted, which is retained in position by a closure plate or disc 29 which is secured to the base, as by screws 30. The bushing has a portion of the wall thereof cut away, as at 31, for the reception of a portion of the pinion 26. Mounted for reciprocal vertical movement in the bushing 28 is a rack 32 which is in mesh with the teeth of the pinion 26, and has a portion 33 at its upper end, forming an index pin. The bushing is provided in its upper end with grooves or recesses 34 and 35 which are disposed diametrically opposite each other, the groove 34 being in alignment with an oil groove 36 cut through the rib 7, and the groove 35 being in alignment with an oil groove 37 in the top 1, which extends from the opening 27 to a counterbore 38 of an opening 39 in the hub portion 3 of the base.

The pin 26 has mounted thereon a cylindrical follower 40, preferably made of brass tubing, and adapted for reciprocal sliding movement in a cylindrical recess 41 in plate or disc 42. The plate or disc 42 is supported on a thrust member 43, which is keyed to a pin 44 supported in a bushing 45, which, in turn, is supported in the counterbore 38 of the base. The thrust member 43 is supported on a washer 46 which is secured against the lower face of the thrust member by means of a nut 47 which is threadedly secured to the lower end of the pin 44. The plate or disc 42 is adapted to be rotated through a predetermined arc, about the thrust member 43, and in order to permit this rotation, without causing binding between the parts, the plate 42 has a spherical lower surface 48 which rests on a complementary spherical upper surface 49 of the thrust member. The bushing 45 has a groove 50 in its upper end, which groove is in alignment with the inner end of the oil groove 37.

The disc or plate 42 has mounted therein at points spaced 120 degrees from each other circumferentially of the disc, pins 51 having heads 52 provided with cam faces 53 inclined in a direction circumferentially of the disc, the faces of all of the pins being inclined in the same direction. Supported by the cam faces 53 of these pins are pins 54 which are mounted for vertical sliding movement in the openings 16 in the base, pins 54 having faces 55 at their lower ends which are inclined to correspond to the inclination of the cam faces 53. The inclination of the faces 53 and 55 is about 6 degrees to the horizontal. The pins 54 have faces 56 at their upper ends, which are inclined at 45 degrees to the horizontal, the direction of inclination being at right angles to the direction of inclination of the faces 55.

The faces 56 of the pins 54 are in engagement with similarly inclined faces 57 at the radially-innermost ends of pins or rods 58 which are mounted for sliding axial movement in the openings or passageways 15 of the base. The pins or rods 58 are provided at their radially-outermost ends with inclined faces 59, inclined similarly to the faces 57, but in an opposite direction.

The base 1 is also provided with a base flange 60, whereby the table may be bolted, clamped, or otherwise rigidly secured to the surface of a machine tool in connection with which the table is used. Secured to the base 1, in radial alignment with the center of the index bolt is a guide pin 61 having a pointer 62.

The index table further includes a table proper 63 having T-slots 64 in its upper surface, for facilitating securement to the table of the work. This table is rotatable about the upper portion of the pin 44, and is provided in its underface, adjacent the periphery thereof, with an annular recess 65, forming a track or raceway 66, between which and the raceway 8, a series of circumferentially-spaced rollers 67 are disposed, these rollers being maintained against circumferential as well as axial displacement relatively to each other by means of an annular cage 68, the rollers being disposed in rectangular openings 69 of the cage. The cage rests on the ribs 6 and 7 of the base.

The table 63 is provided with a peripheral depending annular skirt 70 having an annular recess 71 into which the rib 4 of the base extends, and an annular rib 72 which extends into the recess 5 of the base, this combination of ribs and recesses forming an oil seal. Directly above the recess 71 and rib 72, the skirt 70 has an annular recess 73 therein, the lower surface 74 of which is inclined to correspond with the inclination of the faces 59 of the pins 58.

The table 63 is also provided with a recess 75 in which is mounted a bushing 76 which is adapted to receive the index pin 33, for the purpose of locking the table to the base. The recess 75 thus defines one of the stations of the index table, and while only one such recess is shown, it will be readily understood that the table may be provided with any desired number of such recesses, defining additional stations. The skirt 70 is provided with index marks 77, each mark being disposed in radial alignment with a recess 75, so as to furnish an indication, with the guide pointer 62, of the location of a station. The table is also provided in its underface with a recess 78 having an arcuate upper wall 79, the function of which will be presently explained.

The base 1 has formed integrally therewith a boss 80, in which a cylinder 81 is mounted, the cylinder having a rectangular base 82 which is secured to the lower face of the boss 80 by means of screws 83. The base 82 is provided with an oil inlet opening 84 which communicates with the lower end of the cylinder, and with an oil outlet opening 85, which also communicates with the lower end of the cylinder. The opening 84 is provided with a check valve 86, and extending from the opening 85 is a tube 87, which extends through an opening 88 in the base to a groove 89 cut through the rib 7. The cylinder is also provided with diametrically opposed slots 90 in its upper end, which slots accommodate a roller 91 supported in the upper end of a plunger 92, which is slidably mounted in the cylinder 81. The roller 91 is normally urged into engagement with the lower surface of the table 63 by means of a compression coil spring 93 which is interposed between the lower end of the plunger and the base of the cylinder 81.

The cylinder and plunger form an oil pump, the operation of which may be described as follows:

During rotation of the table, as the recess 78 reaches the roller 91, the effect of the spring 93 is to cause the roller to enter the recess, the roller riding along the arcuate wall 79 of this recess. This causes the plunger 92 to move upwardly, thereby sucking oil into the cylinder 81 through the check valve 86 from the oil sump formed within the base 1 of the table. As the roller 91 leaves the recess, the plunger 91 is moved downwardly, forcing the oil through the tube 87 through the groove 89 and into the roller raceway. Some of this oil also flows out of the raceway through the grooves 36, 34, 35 and 37, thereby providing lubrication for the rack 32 and pin 44. In this way, the moving parts of the index table are periodically lubricated.

The operation of the index table may be briefly described, as follows:

With one of the index openings or recesses 75 disposed above the index pin 33, the shaft 19 is rocked by means of a crank applied to the end 24 thereof, to cause the index pin 33 to enter the bushing 76, thereby locking the table 63 against rotation. After the index pin has been thus moved to table locking position, continued rotation of the shaft 19 causes the plate 42 to turn sufficiently to cause the cam faces 53 of the pins 51 to elevate the pins 54, which, in turn, causes the rods 58 to move radially outwardly to bring the faces 59 thereof into frictional wedging engagement with the surface 74 of the recess 73, thereby locking the table to the base. This provides extreme rigidity for the table, where such rigidity is required, as in milling operations. It also eliminates vibration of the table as well as undue strain on the index pin. It will be noted, in this connection, that the table can be locked in this manner only after the index pin enters the bushing 76, and that the table can be rotated only after the table has been unlocked (by reverse rotation of the shaft 19) and withdrawal of the index pin. The proper sequence of functioning of the indexing and locking means is thus assured.

It is thus seen that we have provided an index table which is well adapted for heavy milling or boring operations, and which is equipped with an internal locking mechanism for locking the table to the base, thereby eliminating vibration and strain on the index pin. It will also be seen that for convenience and safety, the index pin and locking mechanism are controlled by a single operating handle or crank; one movement of the handle moving the index pin and operating the locking mechanism, in proper order.

The table top rotates with extreme ease, since it rests on precision rollers which are guided by a retainer ring, and runs on raceways which are preferably hardened and ground. The built-in automatic lubricating system requires only an infrequent change of oil, and efficient oil seals retain the oil and exclude dirt and other foreign matter.

It is to be understood that the form of our invention, herewith shown and described, is to be taken as a preferred example of the same, and that various changes in the shape, size and arrangement of parts may be resorted to, without departing from the spirit of our invention, or the scope of the subjoined claim.

This application is a division of my copending application, Serial No. 95,433, filed May 26, 1949, now Patent No. 2,640,400.

Having thus described my invention, I claim:

In an indexing table, a table having an annular raceway, a rotatable top having an annular raceway, cylindrical rollers mounted between said raceways for facilitating rotation of said top, the raceway on the table being defined by upwardly extending annular ribs forming a channel to receive and hold oil, one of said ribs having a groove therethrough, an oil sump within said base, and means responsive to said rotation for force feeding a lubricant from said sump to said raceways, said means comprising a cylinder mounted in said base and extending vertically through the base, a plunger mounted for reciprocal movement in said cylinder, said plunger having a rotatable roller mounted in its upper end, a compression coil spring supporting said plunger and acting to force said roller into engagement with the lower surface of said top, said lower face having an arcuate recess therein into which said plunger supported roller moves due to the pressure of said spring to draw lubricant from said sump and out of which said plunger supported roller moves when oil is forced to said raceways, a check valve responsive to upward movement of said plunger for drawing oil through the valve from said sump at a predetermined point of rotation of said top, and a conduit communicating with the groove in said rib and said cylinder through which said plunger by downward movement thereof forces oil to said raceways, said check valve being closed when said oil is forced through said conduit.

References Cited in the file of this patent

UNITED STATES PATENTS

| | | |
|---|---|---|
| 1,492,653 | Sears | May 6, 1924 |
| 1,798,496 | Reid | Mar. 31, 1931 |
| 2,140,983 | Carter | Dec. 20, 1938 |
| 2,300,313 | Pool | Oct. 27, 1942 |
| 2,343,302 | Kocher | Mar. 7, 1944 |
| 2,354,644 | Balstad | Aug. 1, 1944 |
| 2,570,444 | Henkel | Oct. 9, 1951 |
| 2,579,238 | Lippmann | Dec. 18, 1951 |
| 2,640,400 | Verderber | June 2, 1953 |
| 2,643,920 | Olszewski | June 30, 1953 |

FOREIGN PATENTS

| | | |
|---|---|---|
| 916,485 | France | Aug. 19, 1946 |
| 625,403 | Germany | Feb. 8, 1936 |